United States Patent Office 3,311,558

Patented Mar. 28, 1967

3,311,558
N-ALKYLMORPHOLINONE ESTERS OF ALKENYLSUCCINIC ANHYDRIDES

Charles J. Prizer, Moorestown, N.J., and William D. Emmons, Huntingdon Valley, Pa., assignors to Rohm & Haas Company, Philadelphia, Pa., a corporation of Delaware No Drawing. Filed Nov. 24, 1964, Ser. No. 413,654
17 Claims. (Cl. 252—47.5)

This application is a continuation-in-part of application Ser. No. 368,703, filed May 19, 1964, now abandoned.

This invention deals with novel N-alkylmorpholinone esters of alkenylsuccinic anhydrides. It also deals with lubricating oil and fuel compositions containing these N-alkylmorpholinone esters of alkenylsuccinic anhydrides. It further deals with a method for the preparation of these N-alkylmorpholinone esters of alkenylsuccinic anhydrides.

The compounds of the present invention may be represented by the following formulas:

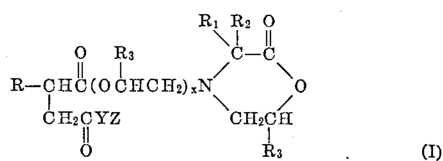

(I)

and

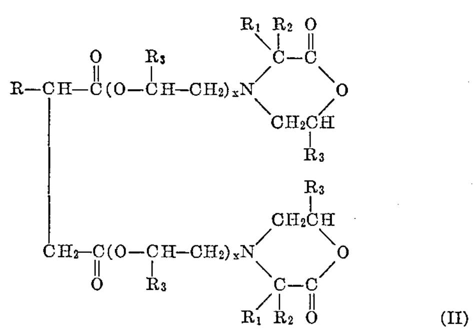

(II)

$R_1$ represents hydrogen or alkyl of 1 to 8 carbon atoms, preferably hydrogen or alkyl of 1 to 4 carbon atoms.

$R_2$ represents hydrogen, alkyl of 1 to 8 carbon atoms or phenyl, preferably hydrogen, phenyl or alkyl of 1 to 4 carbon atoms.

$R_1$ and $R_2$, collectively, and including the carbon atom to which they are attached, represent a sataurated ring of 5 to 7 carbon atoms and optionally containing alkyl substituents of 1 to 4 carbon atoms.

$R_3$ represents hydrogen or methyl.

Y represents oxygen or the group, $NR_4$.

$R_4$ represents hydrogen, alkyl, including cycloalkyl, of 1 to 24 carbon atoms, phenyl, alkylphenyl in which the alkyl substitution contains a total of 1 to 8 carbon atoms, naphthyl, and phenylalkyl in which the alkyl contains 1 to 8 carbon atoms, preferably hydrogen, alkyl or phenyl.

Z represents hydrogen, alkyl of 1 to 24 carbon atoms, phenyl, alkylphenyl in which the alkyl substitution contains a total of 1 to 8 carbon atoms, naphthyl, and phenylalkyl in which the alkyl contains 1 to 8 carbon atoms, preferably hydrogen, alkyl and phenylalkyl. Also, the alkyl embodiments may contain thio, hydroxy or tertiary amino groups at any possible location.

The symbol $x$ represents a number from 1 to 7, preferably 1 to 4.

R represents an alkenyl radical containing about 30 to 200 carbon atoms, which means it will have a molecular weight of about 400 to about 3000, preferably about 600 to about 2500.

Typically, $R_1$ represents hydrogen, methyl, ethyl butyl and octyl.

Typically, $R_2$ represents hydrogen, methyl, propyl, butyl, hexyl, octyl and phenyl.

Collectively, $R_1$ and $R_2$ typically represent cyclopentyl, cyclohexyl and methylcyclohexyl.

Typically, $R_4$ represents hydrogen, methyl, ethyl, butyl, cyclopentyl, cyclohexyl, octyl, dodecyl, octadecyl, tetracosyl, phenyl, tolyl, butylphenyl, xylyl, dibutylphenyl, naphthyl, benzyl, phenylbutyl and phenylhexyl.

Typically, Z represents hydrogen, methyl, ethyl butyl, cyclopentyl, cyclohexyl, octyl, dodecyl, octadecyl, tetracosyl, phenyl, tolyl, butylphenyl, xylyl, dibutylphenyl, naphthyl, benzyl, phenylbutyl, phenylhexyl, hydroxyethyl, hydroxypropyl, hydroxybutyl, dimethylaminoethyl, diethylaminoethyl, diethylaminobutyl, dipropylaminohexyl, ethylthioethyl and butylthioethyl.

The R group is derived by polymerizing an olefin containing 2 to 12 carbon atoms, preferably 2 to 5 carbon atoms, by addition polymerization from substantially pure olefins. These olefins may be either gaseous or liquid under normal conditions and frequently are obtained from the cracking of petroleum and other hydrocarbons. Fractions containing olefinically unsaturated open-chain hydrocarbons are readily available over a wide range of molecular weights and derived from olefins of 2 to 12 carbon atoms. The preferred olefins are those from 2 to 5 carbon atoms, with particular emphasis on the olefin embodiments containing 4 carbon atoms. It is, of course, preferred to employ relatively pure olefins from which sulfur, cyclic compounds and other impurities have been removed.

Mixtures of various olefins, from ethylene to dodecene, may be used or individual embodiments, as desired. Mixtures of specific olefins, from ethylene to pentene, may be advantageously employed. Particularly advantageous for the present purposes are mixtures of the various butenes. Butenes most commonly used comprise both straight and branched chain members. It is also possible, and frequently desirable, to employ a particular isomer, such as isobutylene, but, for the purposes of this invention, separation or isolation of particular isomers is not essential. Thus, the mixtures readily available to the chemical industry are especially useful for the purposes of the present invention. The olefinic polymers employed as starting materials vary from rather fluid liquids to rather viscous liquids at normal temperatures.

Typical olefinic polymers are those prepared from ethylene, propylene, isobutene, 1-butene, 2-butene, 1-pentene, 2-pentene, 1-hexene, 1-octene, 2-octene, 1-decene, 1-dodecene and 2-dodecene.

While the group, R, has been structurally presented as attached to a specific carbon atom with respect to Formula I, it will be understood by those skilled in the art that the R group may be positioned on the other carbon atom that is alpha to the other carbonyl group. The R group enters the molecule concerned by a reaction involving maleic anhydride and, therefore, could be attached to either of the carbon atoms alpha to the carboxyl group. This invention encompasses fully this aspect.

The polyolefin is first reacted with maleic anhydride at temperatures of about 200° to 250° C. for a period of about 6 to 16 hours, as desired. The maleic anhydride is used in excess, preferably about 1.5 to 3 times the stoichiometric amount. The use of excess maleic anhydride tends to maximize yields. The polyolefin reacts with maleic anhydride to form a succinic anhydride derivative which can be separated from the excess maleic anhydride by vacuum distillation or similar treatment. The product can be diluted with xylene or similar solvent and filtered. The olefinicsuccinic anhydride is then reacted with a compound having the formula:

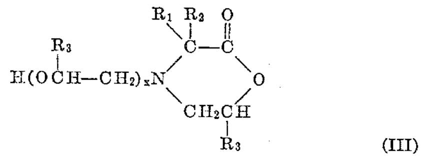

(III)

at a temperature of about 30° to 250° C., preferably 70° to 150° C., wherein a monoester product is obtained corresponding to Formula I where Y is oxygen and Z is hydrogen. To obtain a dimorpholinone ester corresponding to Formula II, one conducts the reaction at a temperature of about 130° to about 250° C. with the liberation of water, which is preferably removed as it is formed. During the reaction that leads to the monomorpholinone ester of Formula I, no water is evolved.

One preferably employs the reactant of Formula III or IV in amounts that correspond to the desired product of either the monoester of Formula I or the diester of Formula II.

In order to produce a compound corresponding to Formula I, other than where Y is oxygen and Z is hydrogen, one reacts in a conventional manner the Formula I monomorpholinone ester with a compound having the formula:

$$ZYH \qquad (IV)$$

If desired, in many instances, one may prefer to reverse the order of reaction and first react the olefinicsuccinic anhydride with a compound (IV) followed by reaction with a compound (III). As will be understood by those skilled in the art, mixtures of products may be obtained in some instances. These are useful for the present purposes and encompassed within the gamut of this invention. At the conclusion of the reaction, the xylene or other suitable solvent is removed, preferably by stripping, and the product is then ready for addition to a lubricating oil or fuel.

Typical embodiments of reactant (III) include N-(2-hydroxyethyl)-2-morpholinone, N-(2-hydroxypropyl)-6-methyl-2-morpholinone, N-(2-hydroxyethyl)-3,3-dimethyl-2-morpholinone, N-(2-hydroxyethyl)-3-methyl-3-ethyl-2-morpholinone, N-(2-hydroxyethyl)-3-octyl-2-morpholinone, N-(2-hydroxyethyl) - 3 - phenyl-2-morpholinone, N-(2 - hydroxyethyl)-3-phenyl-3-methyl-2-morpholinone, N - (2-hydroxyethyl)-3,3-pentamethylene-2-morpholinone and N-(2 - hydroxypropyl) - 3 - phenyl-3,6-dimethyl-2-morpholinone.

Typical embodiments of reactant (IV) include ammonia, methylamine, ethylamine, octylamine, octadecylamine, dimethylamine, diethylamine, dibutylamine, didodecylamine, aniline, naphthylamine, phenylbutylamine, diethylaminoethanol, dibutylaminohexanol, ethylthioethanol, butylthioethanol, octylthiooctanol, ethylene oxide, propylene oxide, butylene oxide, methanol, ethanol, butanol, cyclohexanol, octanol, dodecanol, tetradecanol and octadecanol.

The compounds of this invention are useful as dispersants in lubricating oil and fuel systems. They may be used in the range of about 0.005 to 15% by weight of the oil or fuel composition and may be incorporated therein according to standard techniques. In fuels the range is 0.005 to 5%, preferably 0.01 to 2%, by weight of the fuel composition. In lubricants, the range is 0.1 to 15%, preferably 0.1 to 10%, by weight of the lubricant composition. The compounds of the present invention as evaluated according to several known tests exhibit outstanding activity as dispersants. Particularly valuable are those corresponding to Formula II.

It is realized that under some operating conditions varying amounts of warm to hot water will accumulate which in time hydrolyzes to varying extents the morpholinone portion of the molecule. This does not interfere with the valuable properties described hereinbefore. The following describe some of the tests employed:

*API service MS sequence V test.*—This test evaluates the sludge dispersant characteristics of a lubricant under low and medium temperature operating conditions. An 8-cylinder 368 cu. in. displacement Lincoln-Mercury engine is operated under conditions described in ASTM Special Technical Publication No. 315, published by the American Society for Testing Materials, 1916 Race St., Philadelphia, Pa.

At the end of 192 hours of operation, the engine is disassembled and rated for sludge deposits. The 8 parts rated for sludge (CRC Merit, 10=clean) are the rocker arm assembly, rocker arm cover plate, push rod cover plate, oil screen, oil pan, valve deck, push rod chamber and timing gear cover.

*API service MS sequence V–A test.*—This test evaluates the sludge dispersant characteristics of a lubricant under low and medium temperature operating conditions. A single cylinder oil test engine is operated under conditions described in ASTM Special Technical Publication No. 315, published by the American Society for Testing Materials, 1916 Race St., Philadelphia, Pa.

The engine may be rated at any time during the course of the test. The 7 parts rated for sludge (CRC Merit, 10=clean) are the rocker arm assembly, rocker arm cover plate, valve deck, timing gear cover, push rod cover plate, push rod chamber and oil pan.

*Panel coker test.*—This test is described in the record of the Fifth World Petroleum Congress (1959) in an article by R. M. Jolie, "Laboratory Screening Test for Lubricating Oil, Detergents and Dispersants." A sample of a compound under test is dissolved in a 170 SUS Mid-Continent Solvent Extracted Neutral containing 1% of a thermally unstable zinc dialkyldithiophosphate. The blend is placed in a heated sump and is splashed against a heated panel held at 570° F. for 2 hours. Gain in weight of the panel is determined and compared with oil without the test compound.

*Sundstrand pump test.*—In this test for distillate fuel oils, 1 liter of fuel oil containing 4 grams of synthetic sludge is treated with the additive. The oil is circulated for an hour through a Sundstrand oil burner pump containing a 100-mesh strainer. The sludge deposit is collected and weighed. (Nelson, Osterhaut and Schwindeman, Ind. Eng. Chem., 48, 1892 (1956)).

As will be clearly understood in the art, the fuels contemplated are distillate fuels that boil from 75° to 750° F., which includes gasolines, along with jet and diesel fuels and furnace oils. The present compounds are particularly useful in fuels that boil up to about 600° F., that is, the normal gasolines and jet fuels.

Lubricating compositions of this invention may be based on mineral oils or on synthetic lubricants. The mineral oils may vary over a wide range of viscosity, such as 1 to 25 centistokes at 210° F. These oils may be of naphthenic or paraffinic nature or may be of various mixtures. They may be distillates or mixtures of neutral oils and bright stocks. The lubricants may be bodied or gelled and used as greases, if desired. The oils may vary from spindle oils or hydraulic oils to oils for reciprocating aircraft engines. They include oils for sparking combustion and compression ignition engines, varying from grades identified as S.A.E. 5 to S.A.E. 50. Other types of lubricants are also included, such as hydraulic and automatic transmission fluids.

The synthetic lubricants include esters, such as dioctyl, dinonyl or isodecyl adipates, azelates or sebacates, polyethers and silicones. When use as hydraulic fluids is contemplated, phosphate esters are included as a base.

In the present compositions, there may also be used as a base a transmission fluid, hydraulic fluid, gear oil or grease.

In the compositions of this invention there may be used one or more other additives, such as anti-oxidants, anti-foam agents, anti-rust agents, anti-wear agents, heavy duty detergents, pour-point depressants, viscosity index improvers, or other type of additive. For example, there may be employed one or more of the dithiophosphates, such as zinc, barium or nickel, dialkyldithiophosphate, sulfurized oils, such as sulfurized sperm oil and sulfurized terpenes, phenols, sulfides, alkylaryl sulfonates, petroleum sulfonates whether normal or with alkaline reserve, such as calcium, barium or strontium petroleum sulfonates, polymers and copolymers from alkyl acrylates, methacrylates, itaconates, or fumarates or vinyl carboxylates and mixtures thereof, copolymers or acrylic esters and polar monovinylidene compounds, such as N-vinyl-2-pyrrolidinone, vinylpyridines, aminoalkyl acrylates or methacrylates, or polyethyleneglycol acrylic esters, polybutenes, alkylphenolalkylene oxide condensates, alkenylsuccinic anhydrides, various silicones and alkyl or aryl phosphates, such as tricresyl phosphates. There may also be used 4,4′-methylene-bis-2,6-di-tert-butylphenol, trialkylphenols, tris(dimethylaminomethyl)phenol, phenothiazine, naphthylamines, N′-sec-butyl-N,N-dimethyl-p-phenylenediamine, alkaline earth alkylphenates, alkaline earth salicylates, calcium phenylstearate, alkylamines, especially $C_{12}$–$C_{24}$ alkylamines, cyclic amines, alkyl and aryl imidazolines and alkenylsuccinic anhydrides reacted with amines and then with boron compounds, such as boron oxide, boron halides and boron esters.

A turbo prop lubricant may be prepared by blending the copolymers of this invention with di-2-ethylhexyl sebacate and a mixture of polyesters formed by condensing 2-ethyl-1,3-hexanediol and sebacic acid into the polyesters with 2-ethylhexanol, there being an average of about 3 glycol units per molecule. This composition may also contain anti-oxidant, stabilizer or other useful additives.

The compounds, compositions and method of the present invention may be more fully understood from the following examples which are offered by way of illustration and not by way of limitation. Parts by weight are used throughout.

EXAMPLE 1

To a reaction flask fitted with a stirrer, thermometer, reflux condenser with hot water circulating and electrically heated bath are charged 2890 parts of polybutene of molecular weight 1345 and 338 parts of maleic anhydride. These materials are stirred at 230° C. for 20 hours, followed by stripping at 230° C. under a vacuum of 2 mm. Hg for 2 hours to remove any unreacted maleic anhydride. This material is diluted to a 90% solution with xylene and filtered; the clear, dark amber material, polybutenylsuccinic anhydride, is analyzed and found to contain 0.669 millimole of succinic anhydride per gram of material.

The monoester of polybutenylsuccinic anhydride and N-(2-hydroxyethyl)-2-morpholinone is prepared by mixing 400 parts of polybutenylsuccinic anhydride, freed of xylene by stirring and heating at 170° C. under about 5 mm. Hg, with 38.8 parts of N-(2-hydroxyethyl)-2-morpholinone in a reaction vessel fitted with a stirrer, thermometer and heating jacket. The N-(2-hydroxyethyl)-2-morpholinone shows the following constants: boiling point 165° C./0.5 mm. Hg; $n_D^{26}$ 1.4912 and $d^{24}$ 1.227. These materials are stirred with heating at 155° C. for 6½ hours, after which the reaction product is stripped at 150° to 160° C. under a reduced pressure of 1 mm. Hg for 1 hour. The final product is very viscous at room temperature and clear, dark amber in appearance. An analytical sample subjected to 110° C. under vacuum (5 mm. Hg) for 2 hours shows a non-volatile content of 99.6%.

The reaction product is soluble in 150 SUS mineral oil, whereas the N-(2-hydroxyethyl)-2-morpholinone reactant is not.

One and six tenths parts of the above product is blended with 1 part of a commercial zinc dialkyldithiophosphate into 97.4 parts of a 170 SUS Mid-Continent Solvent Extracted Neutral. The viscosity of this blend is 5.86 cs. at 210° F. and 39.0 cs. at 100° F. with a viscosity index of 101. This lubricant is evaluated in the Sequence V–A engine test. The total sludge rating at the end of 100 hours is 68.2 (70.0=clean). A test on the oil without the additive rates 48.1 at the end of 100 hours.

In the Panel Coker test, a blend containing 1% of the above product of this invention gives a deposit of 37 mg. The same oil without any additive gives a deposit of 322 mg.

In the Sundstrand Pump test at 0.01 part of the above product of this invention in 100 ml. of oil, the weight of sludge is 23 mg., while the oil without additive gives 210 mg.

A similar type product is prepared by employing N-(2-hydroxypropyl)-6-methyl-2-morpholinone.

EXAMPLE 2

The diester of polybutenylsuccinic anhydride and N-(2-hydroxyethyl)-2-morpholinone is prepared by charging the following materials to a reactor fitted with a water separator:

187 parts of polybutenylsuccinic anhydride, prepared as described in Example 1,
45.3 parts of N-(2-hydroxyethyl)-2-morpholinone, and
80 parts of xylene.

This charge is stirred and heated at 155° to 175° C. for 10 hours with the separation of water as a result of complete esterification. The batch is then stripped at 230° to 250° C. under 1 mm. Hg pressure for 2 hours for the removal of any volatile matter. The final product is very viscous. It is clear and dark amber in color. Analysis of this product shows 99.4% non-volatile matter.

One and four tenths parts of the above product is blended with 1 part of a commercial zinc dialkyldithiophosphate into 97.6 parts of a 170 SUS Mid-Continent Solvent Extracted Neutral. The viscosity of this blend is 5.76 cs. at 210° F. and 37.7 cs. at 100° F. with a viscosity index of 102. This lubricant is evaluated in the Sequence V–A engine test. The total sludge rating at the end of 100 hours is 68.9 (70.0=clean). A test on the oil without the additive rates 48.1 at the end of 100 hours.

In the Panel Coker test, a 1% blend of the above product gives a deposit weight of 53 mg. The same oil without the additive of this invention gives a deposit weight of 322 mg.

In the Sundstrand Pump test at 0.01 part in 100 ml. of oil, the weight of sludge is 33 mg., while the oil without the additive of this invention gives 210 mg.

In like manner, a product of this invention is prepared from N-(2-hydroxyethyl)-3,3-dimethyl-2-morpholinone.

EXAMPLE 3

Polybutenylsuccinic anhydride is prepared by allowing polybutene to react with maleic anhydride at 230° C. to give a stripped product which analyzes 0.506 millimole of succinic anhydride per gram of reaction material.

To a reactor fitted for esterification, that is, removal of water as the ester is formed, are charged:

1100 parts of this polybutenylsuccinic anhydride,
201.4 parts of N-(2-hydroxyethyl)-2-morpholinone, representing an excess of 25%, and
390 parts of xylene.

These materials are stirred and heated at 175° to 180° C. for 7 hours. At the end of this time, the water formed in the reaction and collected in a Dean-Stark water trap has become constant. The reaction product is then filtered, followed by stripping at 215° to 240° C. under 0.6 mm. Hg pressure for 1⅔ hours. The final product is very viscous. It is clear and dark amber in appearance. Analysis for non-volatile matter shows 98.9%.

One and six tenths parts of the above product is blended with 1 part of a commercial zinc dialkyldithiophosphate into 97.4 parts of a 170 SUS Mid-Continent Solvent Extracted Neutral. The viscosity of this blend is 5.77 cs. at 210° F. and 38.2 cs. at 100° F. with a viscosity index of 101. This lubricant is then evaluated in the Sequence V engine test. The total sludge rating at the end of 192 hours is 56.7 (80.0=clean). A test run on the reference oil without any dispersant gives a rating of 32.1.

In the Panel Coker test, a blend containing 1% of the above product gives a deposit weight of 40 mg. The same oil without the above-used additives gives a deposit of 322 mg.

In the Sundstrand Pump test at 0.01 part in 100 ml. of oil, the weight of sludge is 124 mg., while the oil without the additive gives 210 mg.

Analogously, there is prepared a compound of this invention by employing N-(2-hydroxyethyl)-3-methyl-3-ethyl-2-morpholinone.

EXAMPLE 4

A reaction vessel is charged with 1526 parts of polybutene (of molecular weight 959) and 250 parts of maleic anhydride. These materials are allowed to react under conditions at 230° C. for sufficient time that, upon stripping at 230° C. under reduced pressure of 1 mm. Hg for 2½ hours to remove unreacted maleic anhydride and any volatile matter, a product is formed which analyzes 0.840 millimole of succinic anhydride per gram of material. Enough xylene is added to dilute this material to a concentration of 90%.

The diester of this polybutenylsuccinic anhydride and N-(2-hydroxyethyl)-2-morpholinone is prepared by charging the following materials to a reactor fitted with a water separator:

450 parts of the above polybutenylsuccinic anhydride,
130.6 parts of N-(2-hydroxyethyl)-2-morpholinone, and
116.0 parts of xylene.

The charge is stirred and heated at 170° to 185° C. for 18 hours with the separation of 100% of the theoretical amount of water, indicating complete esterification. The batch is then stripped at 230° to 250° C. under 1 mm. Hg pressure for 2 hours to remove any volatile matter. The final product has a viscosity of 2370 cs. at 210° F. It is clear and dark amber in appearance.

In the Panel Coker test, a blend containing 1% of the above product gives a deposit weight of 46 mg. The same oil without the additive gives a deposit weight of 322 mg.

One and three tenths parts of the product is blended with 1 part of a commercial inc dialkyldithiophosphate into 97.7 parts of a 170 SUS Mid-Continent Solvent Extracted Neutral Oil. The viscosity of this blend is 5.76 cs. at 210° F. and 37.7 cs. at 100° F. with a viscosity index of 102. This lubricating oil composition is evaluated in the Sequence V–A engine test. The total sludge rating at the end of 100 hours is 69.1 (70.0=clean). A test without the diester additives rates 48.1 at the end of 100 hours.

In the Sundstrand Pump test at 0.01 part in 100 ml. of oil, the weight of sludge is 60 mg., while the oil without any additive gives 210 mg.

Likewise, there is prepared a compound of this invention by using N-(2-hydroxyethyl)-3-octyl-2-morpholinone.

EXAMPLE 5

A polypropenylsuccinic anhydride is obtained by allowing chlorinated polypropene of average number molecular weight of about 900 and a chlorine content of 3.9% to react with maleic anhydride at 220° C. The polypropenylsuccinic anhydride analyzes 0.91 millimole of anhydride per gram of material.

To 450 parts of this polypropenylsuccinic anhydride is added 148.5 parts of N-(2-hydroxyethyl)-2-morpholinone with 155 parts xylene and heated at 175° C. for 15 hours to give the diester.

Following the preparation of the diester, the batch is stripped, removing the xylene and the excess N-(2-hydroxyethyl)-2-morpholinone.

This diester shows excellent dispersancy characteristics.

Two parts of the above product is blended with 1 part of a commercial zinc dialkyldithiophosphate into 97 parts of a 170 SUS Mid-Continent Solvent Extracted Neutral. This lubricant is then evaluated in the Sequence V–A engine test. The total sludge rating at the end of 100 hours is 67.7 (70.0=clean). A test without the additive of this example rates 48.1 at the end of 100 hours.

In a similar way, a product of this invention is prepared from polypentenylsuccinic anhydride and N-(2-hydroxyethyl)-3-phenyl-2-morpholinone.

EXAMPLE 6

In a similar manner, the diester of a substituted succinic anhydride derived from 75% ethylene and 25% isodecene (average number molecular weight of 900) is obtained on reaction with N-(2-hydroxyethyl)-2-morpholinone, under the conditions shown in Example 5.

The product is an effective dispersant. In the Sundstrand Pump test at 0.01 gram in 100 ml. of oil, the weight of sludge is 68 mg., while the oil without any additive gives 210 mg.

EXAMPLE 7

A copolymer is prepared from 95 parts of isobutylene and 5 parts of styrene and has an average number molecular weight of 960. A reaction vessel is charged with 1530 parts of this copolymer and 250 parts of maleic anhydride. These materials are allowed to react under conditions at 230° C., for sufficient time that, upon stripping at 230° C. under a reduced pressure of 1 mm. of Hg for 2 hours to remove unreacted maleic anhydride and any volatile matter, a product is formed which analyzes 0.85 millimole of succinic anhydride per gram of material. Sufficient xylene is added to dilute this material to a concentration of 90%.

The diester of this substituted succinic anhydride and N-(2-hydroxyethyl)-3-methyl-2-morpholinone is prepared by charging the following materials to a reactor fitted with a water separator:

450 parts of the substituted succinic anhydride,
143.4 parts of N-(2-hydroxyethyl)-3-methyl-2-morpholinone, and
116 parts of xylene.

After stirring and heating at 170° C. for 15 hours to effect esterification, the batch is stripped at 200° C. under 1 mm. of Hg pressure for 2 hours for the removal of volatile matter. The final product is viscous and dark amber in color.

In the Panel Coker test, a blend containing 1% of this product gives a deposit weight of 50 mg. The same oil without any additive gives a deposit weight of 322 mg.

In the Sundstrand Pump test at 0.01 gram in 100 ml. of oil, the weight of sludge is 65 mg., while the oil without any additive gives 210 mg.

EXAMPLE 8

A copolymer of average number molecular weight of 900 derived from 85 parts of isobutylene and 15 parts of α-dodecene is allowed to react with maleic anhydride, as described in the above example, so that a succinic anhydride results. On titration with alcoholic potassium hydroxide, it is found that the product analyzes 0.89 millimole of succinic anhydride per gram of material.

The monoester of this succinic anhydride and N-(2-hydroxy-2-methylethyl)-6-methyl-2-morpholinone is prepared by mixing 500 parts of the alkenylsuccinic anhydride with 77 parts of N-(2-hydroxy-2-methylethyl)-6-methyl-2-morpholinone. On heating at 160° C. for 6 hours, the monoester forms. The final product is stripped at 180° C. under a reduced pressure of 1 mm. of Hg.

In the Panel Coker test, a blend containing 1% of the product gives a deposit weight of 35 mg. The same oil without any additive gives a deposit weight of 322 mg.

EXAMPLE 9

A stirred and heated autoclave is charged with 400 parts of the solvent-free polybutenylsuccinic anhydride described in Example 1. This resin is then heated to 125° C. and the autoclave is evacuated to 20 mm. Hg. Into this stirred solution under autogenous pressure is distilled 4.5 parts of dry ammonia. The mixture is heated at 125° C. for 4 hours and is then vented. The product is diluted with 200 ml. of xylene and transferred to an esterification reactor fitted with a water separator. To this reactor is added 39 parts of N-(2-hydroxyethyl)-2-morpholinone, and the resulting mixture is heated at 155° to 175° C. until separation of the water azeotrope ceases. The batch is then stripped at 200° C. under 10 mm. Hg with a dry nitrogen sparge. There is obtained a viscous amber product which assays 99.2% solids.

In the Panel Coker test, a blend containing 1% of the above product gives a deposit weight of 16 mg. The same oil without any additive gives a deposit weight of 322 mg.

In the Sundstrand Pump test at 0.01 gram in 100 ml. of oil, the weight of sludge is 20 mg., while the oil without any additive gives 210 mg.

EXAMPLE 10

To 400 parts of the solvent-free polybutenylsuccinic anhydride of Example 1 is added 25.2 parts of aniline. The stirred mixture is heated at 80° C. for 12 hours. To the resulting product is added 39 parts of N-(2-hydroxyethyl)-2-morpholinone and the amide-ester is worked up as described in Example 9. The viscous dark brown product assays 99.3% solids.

In the Panel Coker test, a blend containing 1% of the above product gives a deposit weight of 32 mg. The same oil without any additive gives a deposit weight of 322 mg.

In the Sundstrand Pump test at 0.01 gram in 100 ml. of oil, the weight of sludge is 15 mg., while the oil without any additive gives 210 mg.

EXAMPLE 11

To 435 parts of the solvent-free monoester of polybutenylsuccinic anhydride and N-(2-hydroxyethyl)-2-morpholinone described in Example 1 are added 100 parts of 2-ethylhexyl alcohol and 50 parts of xylene. The mixture is heated and stirred at 155° to 175° C. until separation of water ceases. The batch is then stripped at 250° C. under 1 mm. Hg for 4 hours to remove the volatile material. There is obtained a viscous amber product which assays 99.5% non-volatile matter.

In the Panel Coker test, a blend containing 1% of the above product gives a deposit weight of 18 mg. The same oil without any additive gives a deposit weight of 322 mg.

In the Sundstrand Pump test at 0.01 gram in 100 ml. of oil, the weight of sludge is 28 mg., while the oil without any additive gives 210 mg.

EXAMPLE 12

Two hundred parts of the monoester acid described in Example 1 is heated with stirring in an autoclave to 120° C. The autoclave is evacuated and 5.4 parts of ethylene oxide is allowed to distill into the autoclave. After 6 hours at 120° C., the autoclave is cooled and vented. There is obtained a viscous amber product which comprises 99% of non-volatile material.

In the Panel Coker test, a blend containing 1% of the above product gives a deposit weight of 23 mg. The same oil without any additive gives a deposit weight of 322 mg.

In the Sundstrand Pump test at 0.01 gram in 100 ml. of oil, the weight of sludge is 30 mg., while the oil without any additive gives 210 mg.

EXAMPLE 13

To 435 parts of the solvent-free monoester acid described in Example 1 are added 100 parts xylene and 50 parts of N,N-diethylaminoethanol. The mixture is heated and stirred at 155° to 175° C. until water removal is complete. The batch stripped at 250° C. under 1 mm. Hg gives a viscous amber product assaying 99.2% non-volatile matter.

In the Panel Coker test, a blend containing 1% of the above product gives a deposit weight of 8 mg. The same oil without any additive gives a deposit weight of 322 mg.

In the Sundstrand Pump test at 0.01 gram in 100 ml. of oil, the weight of sludge is 12 mg., while the oil without any additive gives 210 mg.

One and two tenths parts of the above product is blended with 1 part of a commercial zinc dioctyldithiophosphate and 5.0% of a 25% copolymer comprising 50% butyl methacrylate and 50% stearyl methacrylate in 75% of 100 SUS oil into 93.8 parts of a 170 SUS Mid-Continent Solvent Extracted Neutral Oil. The viscosity of this blend is 11.12 cs. at 210° F. and 58.9 cs. at 100° F. with a V.I. of 150. This lubricating oil composition is evaluated in the Sequence V–A engine test. The total sludge rating at the end of 100 hours is 68.9 (70.0=clean). A test without the product rates 48.1 at the end of 100 hours.

EXAMPLE 14

The procedure of Example 13 is followed by using 28.6 parts of ethylthioethanol instead of the N,N-diethylaminoethanol. The batch is stripped at 175° C. under 10 mm. Hg with a nitrogen sparge. The product is a very dark viscous liquid assaying 99.3% solids.

In the Panel Coker test, a blend containing 1% of the above product gives a deposit weight of 18 mg. The same oil without any additive gives a deposit weight of 322 mg.

In the Sundstrand Pump test at 0.01 gram in 100 ml. of oil, the weight of sludge is 25 mg., while the oil without any additive gives 210 mg.

EXAMPLE 15

Following the procedure of Example 1, an ester-acid is prepared from 2-(2-hydroxyethoxy)ethyl-2-morpholinone, B.P. 167° to 170° C. (0.3 mm.), and polybutenylsuccinic anhydride. The product assays 99.1% solids.

In the Panel Coker test, a blend containing 1% of the above product gives a deposit weight of 14 mg. The same oil without any additive gives a deposit weight of 322 mg.

In the Sundstrand Pump test at 0.01 gram in 100 ml. of oil, the weight of sludge is 32 mg., while the oil without any additive gives 210 mg.

EXAMPLE 16

The half-acid amide of polybutenylsuccinic anhydride and t-butylamine is prepared by mixing 409.9 parts of polybutenylsuccinic anhydride (an anhydride content of 0.502 millimole per gram of material, prepared by allowing polybutene of molecular weight 1345 to react with maleic anhydride at 230° C.) with 15.05 parts of t-butylamine and 65 parts of benzene for 6¼ hours at 60° to 70° C. The reaction product is then stripped for 1½ hours at 140° C. and 1 mm. of Hg to remove the benzene and any unreacted t-butylamine. The product is clear and dark amber in appearance and has a nitrogen (Kjeldahl) content of 0.655% (theoretical nitrogen for a 100% reaction is 0.68%).

The derivative of N-(2-hydroxyethyl)-2-morpholinone is prepared by adding 29.8 parts of N-(2-hydroxyethyl)-

2-morpholinone and 115 parts of xylene to the above reaction product. This charge is heated 10 hours at 170° C. to effect esterification. The xylene and volatile matter are removed by stripping under reduced pressure. The ester-amide derivative of this polybutenylsuccinic anhydride shows excellent dispersant properties.

In the Panel Coker test, a blend containing 1% of the above product gives a deposit weight of 25 mg. The same oil without any additive gives a deposit weight of 322 mg.

One and five tenths parts of the product is blended with 1 part of a commercial zinc dioctyldithiophosphate and with 6.5% of a 30% copolymer comprising 30% lauryl methacrylate, 15% hexyl methacrylate, 25% butyl methacrylate and 30% stearyl methacrylate in 70% of 150 SUS oil into 91 parts of a 170 SUS Mid-Continent Solvent Extracted Neutral Oil. The viscosity of this blend is 11.00 cs. at 210° F. and 63.1 cs. at 100° F. with a V.I. of 144. This lubricating oil composition is evaluated in the Sequence V–A engine test. The total sludge rating at the end of 100 hours is 69.1 (70.0=clean). A test without the product rates 48.1 at the end of 100 hours.

EXAMPLE 17

Two parts of the product of Example 3 is blended with 0.7 part of 4,4'-methylenebis-(2,6-di-t-butylphenol), 1.0 part of tricresylphosphate, and 0.30 part of sulfurized sperm oil (10% S) into 96 parts of a 170 SUS Mid-Continent Solvent Extracted Neutral Oil. The viscosity of this blend is 5.81 cs. at 210° F. and is 38.32 cs. at 100° F. with a V.I. of 102. This lubricant is then evaluated in the Sequence V engine test. The total sludge rating at the end of 192 hours is 73.2 (80.0=clean). A test run on the reference oil without any dispersant gives a rating of 32.1.

We claim:

1. A composition selected from the class consisting of

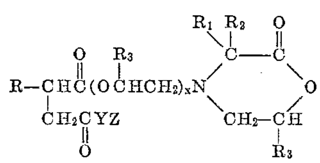

(I)

and

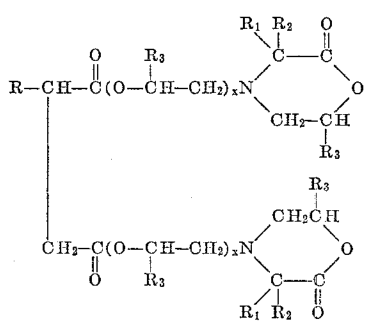

(II)

wherein R represents an alkenyl radical containing about 30 to 200 carbon atoms, $R_1$, individually, is selected from the class consisting of hydrogen and alkyl of 1 to 8 carbon atoms, $R_2$, individually, is selected from the class consisting of hydrogen, phenyl and alkyl of 1 to 8 carbon atoms, $R_1$ and $R_2$, collectively, and including the carbon atom to which they are attached, represent a saturated ring of 5 to 7 carbon atoms, optionally containing alkyl substituents of 1 to 4 carbon atoms, $R_3$ is selected from the class consisting of hydrogen and methyl, Y is selected from the class consisting of oxygen and the group, $NR_4$, $R_4$ is selected from the class consisting of hydrogen, alkyl of 1 to 24 carbon atoms, phenyl, alkylphenyl in which the alkyl substitution contains a total of 1 to 8 carbon atoms, naphthyl and phenylalkyl in which the alkyl contains 1 to 8 carbon atoms, Z is selected from the class consisting of hydrogen, alkyl of 1 to 24 carbon atoms, optionally containing a group selected from the class consisting of thio, hydroxy and tertiary amino, phenyl, alkylphenyl in which the alkyl substitution contains a total of 1 to 8 carbon atoms, naphthyl and phenylalkyl in which the alkyl contains 1 to 8 carbon atoms, and $x$ represents a number from 1 to 7.

2. A composition according to said (I) of claim 1 wherein $R_1$, $R_2$, $R_3$, $R_4$ and Z are hydrogen, Y is oxygen, and $x$ is 1.

3. A composition according to said (I) of claim 1 wherein $R_1$, $R_2$, $R_4$ and Z are alkyl.

Y is oxygen, $R_3$ is hydrogen, and $x$ is 1.

4. A composition according to said (II) of claim 1 wherein $R_1$, $R_2$, and $R_3$ are hydrogen and $x$ is 1.

5. A compoistion according to said (II) of claim 1 wherein $R_1$ and $R_2$ are alkyl, $R_3$ is methyl and $x$ is 1.

6. A composition according to claim 2 wherein R is derived from an olefin having 2 to 5 carbon atoms.

7. A composition according to claim 2 wherein R is derived from an olefin having 4 carbon atoms.

8. A composition according to claim 4 wherein R is derived from an olefin having 2 to 5 carbon atoms.

9. A composition according to claim 4 wherein R is derived from an olefin having 4 carbon atoms.

10. A composition selected from the class consisting of lubricating oils and normally liquid hydrocarbon fuels comprising having incorporated therein a minor amount sufficient to impart dispersancy of the composition of claim 1.

11. A lubricating composition having incorporated therein a minor amount sufficient to impart dispersancy of the composition of claim 2.

12. A lubricating composition having incorporated therein a minor amount sufficient to impart dispersancy of the composition of claim 4.

13. A normally liquid hydrocarbon fuel composition having incorporated therein a minor amount sufficient to impart dispersancy of the composition of claim 2.

14. A normally liquid hydrocarbon fuel composition having incorporated therein a minor amount sufficient to impart dispersancy of the composition of claim 4.

15. A method for the preparation of the composition of claim 1 which comprises reacting a polyolefin in the presence of an excess of maleic anhydride at a temperature range of about 200° to 250° C. to form an olefinic succinic anhydride which is then reacted with an N-(2-hydroxyethyl)-2-morpholinone at a temperature of about 30° to 250° C.

16. The method according to claim 15 comprising producing a diester.

17. The method according to claim 15 comprising initially producing a monoester and then reacting said monoester with a compound having the formula

ZYH to form a diester.

References Cited by the Examiner

UNITED STATES PATENTS 3,219,666 11/1965 Norman et al. ---- 252—51.5 X

References Cited by the Applicant

UNITED STATES PATENTS 3,018,247 1/1962 Anderson et al.
3,018,250 1/1962 Anderson et al.
3,018,291 1/1962 Anderson et al.
3,024,195 3/1962 Drummond et al.
3,024,237 3/1962 Drummond et al.
3,039,860 6/1962 Andress et al.
3,048,544 8/1962 Stewart et al.
3,087,936 4/1963 Le Suer.
3,131,150 4/1964 Stuart et al.
3,135,765 6/1964 Andress et al.

DANIEL E. WYMAN, *Primary Examiner.*

P. P. GARVIN, *Assistant Examiner.*